(12) United States Patent  
Ogawa et al.

(10) Patent No.: US 8,467,642 B2  
(45) Date of Patent: Jun. 18, 2013

(54) WAVEGUIDE TYPE OPTICAL DEVICE

(75) Inventors: Daisuke Ogawa, Yokohama (JP); Takashi Saida, Yokohama (JP); Yuji Moriya, Yokohama (JP); Shigeo Nagashima, Yokohama (JP); Yasuyuki Inoue, Atsugi (JP); Shin Kamei, Atsugi (KR)

(73) Assignees: NTT Electronics Corporation, Kanagawa (JP); Nippon Telegraph and Telephone Corporation, Tokyo (JP)

( * ) Notice: Subject to any disclaimer, the term of this patent is extended or adjusted under 35 U.S.C. 154(b) by 340 days.

(21) Appl. No.: 12/918,406

(22) PCT Filed: Feb. 19, 2009

(86) PCT No.: PCT/JP2009/052851  
§ 371 (c)(1),  
(2), (4) Date: Aug. 19, 2010

(87) PCT Pub. No.: WO2009/104664  
PCT Pub. Date: Aug. 27, 2009

(65) Prior Publication Data  
US 2010/0322556 A1 Dec. 23, 2010

(30) Foreign Application Priority Data  
Feb. 22, 2008 (JP) ................................. 2008-041612

(51) Int. Cl.  
*G02B 6/26* (2006.01)  
*G02B 6/42* (2006.01)  
*G02B 6/34* (2006.01)

(52) U.S. Cl.  
USPC ........ 385/28; 385/1; 385/15; 385/31; 385/32; 385/37; 385/39; 385/50

(58) Field of Classification Search  
USPC ....................................................... 385/28, 37  
See application file for complete search history.

(56) References Cited

U.S. PATENT DOCUMENTS  
6,304,687 B1 * 10/2001 Inoue et al. ..................... 385/14

FOREIGN PATENT DOCUMENTS  
| JP | 4-241304 | 8/1992 |
| JP | 2000-28979 A | 1/2000 |
| JP | 2000-121850 A | 4/2000 |
| JP | 2003-149478 A | 5/2003 |
| JP | 2007-286426 A | 11/2007 |
| WO | WO98/36299 | 8/1998 |

OTHER PUBLICATIONS

English translations of International Preliminary Report on Patentability and Written Opinion for corresponding International Patent Application No. PCT/JP2009/052851.  
International Search Report dated Mar. 17, 2009 for corresponding International Patent Application No. PCT/JP2009/052851 (w/ English translation).

* cited by examiner

*Primary Examiner* — Ryan Lepisto  
(74) *Attorney, Agent, or Firm* — Ohlandt, Greeley, Ruggiero and Perle, L.L.P.

(57) ABSTRACT

An arrayed waveguide grating optical multiplexer/demultiplexer according to the present invention including an input channel waveguide, an input slab waveguide, an arrayed waveguide, a polarization dependence eliminating means, an output slab waveguide, a temperature compensating means, and an output channel waveguide is characterized in that the temperature compensating means compensates for the temperature dependence of the optical path lengths in the channel waveguides of the arrayed waveguide, and the polarization dependence eliminating means eliminates the temperature dependence and the polarization dependence of the arrayed waveguide grating optical multiplexer/demultiplexer at the same time.

3 Claims, 11 Drawing Sheets

WAVEGUIDE TYPE OPTICAL DEVICE

TECHNICAL FIELD

The present invention relates to an optical multiplexer/demultiplexer to be applied to optical communications, and more particularly, to a waveguide type optical device that multiplexes and demultiplexes optical signals of different wavelengths in wavelength division multiplexing systems.

BACKGROUND ART

In wavelength division multiplexing systems, optical multiplexers/demultiplexers that multiplex or demultiplex a large number of optical signals of different wavelengths are essential. As the optical multiplexers/demultiplexers, arrayed waveguide grating optical multiplexers/demultiplexers are often used in view of the mass-productivity and stability of those multiplexers/demultiplexers. Conventional arrayed waveguide grating optical multiplexers/demultiplexers will be described below as waveguide type optical devices. The waveguide type optical devices may also be Mach-Zehnder interferometers.

A silicon wafer is used as the waveguide substrate of each arrayed waveguide grating optical multiplexer/demultiplexer, and silica glass is used as the material of the waveguides to be formed on the silicon wafer. FIG. 1 shows a conventional arrayed waveguide grating optical multiplexer/demultiplexer 101. The transmission center wavelength of the arrayed waveguide grating optical multiplexer/demultiplexer 101 is determined by the mathematical equation 1:

$$AWG \text{ transmission center wavelength: } \lambda_0 = \frac{n_c \times \Delta L}{m} \quad \text{[Equation 1]}$$

Here, $\lambda_0$ represents the center wavelength, $\Delta L$ represents the difference in length between adjacent channel waveguides in the arrayed waveguide, m represents the diffraction order, and $n_c$ represents the refractive index of the channel waveguide.

However, there is a difference in the thermal expansion between the silicon of the waveguide substrate and the silica glass of the waveguide material. Internal residual stress is caused during the process of cooling from a high temperature to room temperature in the manufacture, and waveguide birefringence of approximately 0.0002 is caused due to stress in the arrayed waveguide. This waveguide birefringence causes the transmission center wavelength shift of a TM mode having an electric field perpendicular to the substrate to the longer wavelength, compared with the transmission center wavelength of a TE mode having an electric field parallel to the substrate. In other words, a wavelength shift is caused due to the polarization dependence of the transmission center wavelength. The difference in transmission center wavelength between the TM mode and the TE mode will be hereinafter referred to as the polarization wavelength shift. This polarization wavelength shift is approximately 0.2 nm in an arrayed waveguide grating optical multiplexer/demultiplexer of 0.4 nm in demultiplexing wavelength spacing.

Conventionally, as a polarization dependence eliminating means that eliminates the polarization wavelength shift, there has been a suggested technique in which a polarization mode converter formed with a half-wave plate having a principal axis tilted 45° with respect to the substrate is inserted to an arrayed waveguide, and the TE mode and the TM mode are converted each other (see Patent Document 1, for example). FIG. 2 shows a conventional arrayed waveguide grating optical multiplexer/demultiplexer 102. A polarization dependence eliminating means 17 is placed so that the right and left waveguide structures become symmetric, and the polarization dependence of the difference in optical path length (the product of the effective refractive index and the waveguide length) between right and left is canceled each other for in the manner expressed by the following mathematical equation 2:

$$AWG \text{ transmission center wavelength } (TE): \lambda_{TE} = \quad \text{[Equation 2]}$$

$$\underbrace{\frac{1}{2} \times \frac{n_{CTE} \times \Delta L}{m} + \frac{1}{2} \times \frac{n_{CTM} \times \Delta L}{m}}$$

$$AWG \text{ transmission center wavelength } (TM): \lambda_{TM} =$$

$$\underbrace{\frac{1}{2} \times \frac{n_{CTM} \times \Delta L}{m}}_{\text{Left side of AWG}} + \underbrace{\frac{1}{2} \times \frac{n_{CTE} \times \Delta L}{m}}_{\text{Right side of AWG}}$$

AWG transmission center wavelength difference $(TE\text{-}TM): \lambda_{TE} - \lambda_{TM} = 0$ Here, $n_{CTE}$ represents the refractive index of the TE-mode channel waveguide, $n_{CTM}$ represents the refractive index of the TM-mode channel waveguide, $\lambda_{TE}$ represents the transmission center wavelength of the TE mode that the arrayed waveguide grating optical multiplexer/demultiplexer transmits, and $\lambda_{TM}$ represents the transmission center wavelength of the TM mode that the arrayed waveguide grating optical multiplexer/demultiplexer transmits.

On the other hand, as expressed by the mathematical equation 1, $\lambda_0$ is determined by the optical path length difference. Since the optical path length difference depends on temperature, $\lambda_0$ also depends on temperature. Therefore, when an arrayed waveguide grating optical multiplexer/demultiplexer is used in an environment where the change in temperature is approximately 10 to 60° C., a control operation is required to maintain the arrayed waveguide grating at a constant temperature. However, if a heater or a Pertier device is used, the arrayed waveguide grating optical multiplexer/demultiplexer becomes large in size, and the cost of the arrayed waveguide grating optical multiplexer/demultiplexer becomes higher. To counter this problem, there has been a suggested method of inserting a temperature-dependence compensator having a thermal index coefficient with a different sign from the waveguides at a rate as to the optical path length difference (see Patent Document 2, for example). FIG. 3 shows a conventional arrayed waveguide grating optical multiplexer/demultiplexer 103. A temperature-dependence compensator having a thermal index coefficient with a different sign from the waveguides is inserted at a rate as to the optical path length difference, and the temperature dependence of the wavelength is canceled each other as expressed by the following mathematical equation 3:

$$AWG \text{ transmission center wavelength } \lambda_{Temp} = \quad \text{[Equation 3]}$$

$$\underbrace{\frac{n_c \times (\Delta L - \Delta L')}{m}}_{\text{AWG waveguide}} + \underbrace{\frac{n' \times \Delta L'}{m}}_{\substack{\text{Temperature-dependence} \\ \text{compensator inserting portion}}}$$

Here, n' represents the refractive index of the temperature compensating means, $\Delta L'$ represents the difference in length between adjacent channel waveguides of the temperature-dependence compensator inserting portion, and $\lambda_{Temp}$ represents the transmission center wavelength that the arrayed waveguide grating optical multiplexer/demultiplexer transmits.

Patent Document 1: Japanese Patent Application Laid-Open No. 4-241304

Patent Document 2: International Publication WO98/36299 pamphlet

DISCLOSURE OF THE INVENTION

Problems to be Solved by the Invention

Where conventional arts are combined to solve both the polarization dependence and the temperature dependence of an arrayed waveguide grating optical multiplexer/demultiplexer, the arrayed waveguide grating optical multiplexer/demultiplexer has a structure in which a temperature-dependence compensator is placed on the right side or left side of the polarization dependence eliminating means 17, as in the arrayed waveguide grating optical multiplexer/demultiplexer 104 of FIG. 4. The transmission center wavelength of the arrayed waveguide grating optical multiplexer/demultiplexer 104 is expressed by the mathematical equation 4:

$AWG$ transmission center wavelength $(TE)$: $\lambda_{TE} =$ [Equation 4]

$$\underbrace{\frac{n_{CTE} \times \left(\frac{\Delta L}{2} - \Delta L'\right)}{m}}_{} + \frac{n' \times \Delta L'}{m} + \frac{n_{CTM} \times \frac{\Delta L}{2}}{m}$$

$AWG$ transmission center wavelength $(TM)$: $\lambda_{TM} =$ $$\underbrace{\frac{n_{CTM} \times \left(\frac{\Delta L}{2} - \Delta L'\right)}{m}}_{\substack{\text{Left side of AWG}\\ \text{(including the temperature}\\ \text{-dependence compensator}\\ \text{inserting portion)}}} + \underbrace{\frac{n' \times \Delta L'}{m}}_{\substack{\text{Temperature}\\ \text{-dependence}\\ \text{compensator}\\ \text{inserting portion}}} + \underbrace{\frac{n_{CTE} \times \frac{\Delta L}{2}}{m}}_{\text{Right side of AWG}}$$

$AWG$ transmission center wavelength difference $$(TE\text{-}TM): \lambda_{TE} - \lambda_{TM} = \frac{(n_{CTM} - n_{CTE}) \times \Delta L'}{m}$$

Further, as in the arrayed waveguide grating optical multiplexer/demultiplexer 105 of FIG. 5, a temperature-dependence compensator may be placed on an input slab waveguide or an output slab waveguide, so that both the polarization dependence and the temperature dependence can be eliminated with low loss. The transmission center wavelength of the arrayed waveguide grating optical multiplexer/demultiplexer 105 is expressed by the mathematical equation 5:

$AWG$ transmission center wavelength $(TE)$: $\lambda_{TE} =$ [Equation 5]

$$\frac{n_{CTE} \times \frac{\Delta L}{2}}{m} + \frac{n' \times \Delta L'}{m} - \frac{n_{STE} \times \Delta L'}{m} + \frac{n_{CTM} \times \frac{\Delta L}{2}}{m}$$

$AWG$ transmission center wavelength $(TM)$: $\lambda_{TM} =$ $$\frac{n_{CTM} \times \frac{\Delta L}{2}}{m} + \frac{n' \times \Delta L'}{m} - \frac{n_{STM} \times \Delta L'}{m} + \frac{n_{CTE} \times \frac{\Delta L}{2}}{m}$$

$AWG$ transmission center wavelength difference $$(TE\text{-}TM): \lambda_{TE} - \lambda_{TM} = \frac{(n_{STM} - n_{STE}) \times \Delta L'}{m}$$

Here, $n_{STE}$ represents the refractive index of the TE-mode slab waveguide, and $n_{STM}$ represents the refractive index of the TM-mode slab waveguide.

In each of the cases of FIG. 4 and FIG. 5, however, an AWG transmission center wavelength difference (TE-TM) as to the temperature-dependence compensator or a polarization wavelength shift due to insertion of the temperature-dependence compensator is caused when the temperature dependence and the polarization dependence are eliminated at the same time. As a result, the problem of large Polarization Dependent Loss (hereinafter referred to simply as "PDL") is caused.

The present invention has been made to solve the above problems, and an object thereof is to provide an arrayed waveguide grating optical multiplexer/demultiplexer that is capable of eliminating the temperature dependence and the polarization dependence at the same time, and reducing the influence of PDL.

Means for Solving the Problems

In order to achieve the above object, a waveguide type optical device according to the present invention includes: p (p being an integer of 2 or more) waveguides; a polarization dependence eliminating mean provided on the p waveguides; and a temperature-dependence compensator that is provided on the p or (p−1) waveguides, and compensates for temperature dependence of an optical path length difference among the p waveguides. The polarization dependence eliminating means compensates for an optical path length difference between polarization modes on one side of the polarization dependence eliminating means with an optical path length difference between polarization modes on the other side of the polarization dependence eliminating means.

In a case where the waveguide type optical device is an arrayed waveguide grating optical multiplexer/demultiplexer, a polarization dependence eliminating means that eliminates the polarization dependence of the optical path length difference due to birefringence of the arrayed waveguide and the polarization dependence of the optical path length difference of the temperature-dependence compensator is inserted to the arrayed waveguide.

Specifically, according to the present invention, there is provided an arrayed waveguide grating optical multiplexer/demultiplexer including: at least one input channel waveguide formed on a waveguide substrate; an input slab waveguide connected to the input channel waveguide; an arrayed waveguide that is formed with a plurality of channel waveguides connected to the input slab waveguide; a polarization dependence eliminating means provided on the arrayed waveguide; an output slab waveguide connected to the arrayed waveguide; a temperature-dependence compensator that is provided on the input slab waveguide, or on the output slab waveguide, or on the arrayed waveguide, and compensates for temperature dependence of an optical path length difference among the channel waveguides of the arrayed waveguide; and at least one output channel waveguide connected to the output slab waveguide, wherein the polarization dependence eliminating means eliminates polarization dependence of each channel from the input slab waveguide to the output slab waveguide.

The AWG transmission center wavelength difference of the mathematical equation 4 is caused, because the temperature-dependence compensator is placed on one side of the polarization dependence eliminating means, and the optical path length of the waveguide portion including the arrayed waveguide, the input slab waveguide, and the output slab waveguide is reduced. Therefore, the polarization dependence eliminating means eliminates the overall polarization dependence of each of the channels extending from the input slab waveguide to the output slab waveguide, so that the arrayed waveguide grating optical multiplexer/demultiplexer can eliminate the temperature dependence and the polarization dependence at the same time, and reduce the influence of PDL. Since the polarization dependence eliminating means eliminates the overall polarization dependence, the arrayed waveguide grating optical multiplexer/demultiplexer can reduce the influence of PDL, even if the temperature-dependence compensator causes polarization dependence.

For example, in the case of a waveguide type optical device that includes a plurality of waveguides, a polarization dependence eliminating means provided on the plurality of waveguides, and a temperature-dependence compensator that is provided on the plurality of waveguides and compensates for the temperature dependence of the optical path length differences among the plurality of waveguides, the optical path length difference between the polarization modes on one side of the polarization dependence eliminating means can be compensated by the optical path length difference between the polarization modes on the other side of the polarization dependence eliminating means, by virtue of the setting of the polarization dependence eliminating means.

Specifically, the polarization dependence eliminating means of the arrayed waveguide grating optical multiplexer/demultiplexer according to the present invention compensates the optical path length difference between the polarization modes on the input slab waveguide side of the polarization dependence eliminating means by the optical path length difference between the polarization modes on the output slab waveguide side of the polarization dependence eliminating means. By making this compensation, the polarization dependence eliminating means can eliminate the overall polarization dependence.

Where $\Delta L'$ represents the inter-channel difference in length of the inserted portion of the temperature-dependence compensator, and $\Delta L''$ represents the asymmetric correction length to be used by the polarization dependence eliminating means to correct the inter-channel difference in length from the input slab waveguide or the output slab waveguide to the polarization dependence eliminating means, the AWG transmission wavelength difference is expressed by the mathematical equation 6:

AWG transmission center wavelength (TE): $\lambda_{TE} =$ [Equation 6]

$$\frac{n_{CTE} \times \left(\frac{\Delta L}{2} - \Delta L' - \Delta L''\right)}{m} +$$

$$\frac{n' \times \Delta L'}{m} + \frac{n_{CTM} \times \left(\frac{\Delta L}{2} + \Delta L''\right)}{m}$$

AWG transmission center wavelength (TM): $\lambda_{TM} =$ $$\frac{n_{CTM} \times \left(\frac{\Delta L}{2} - \Delta L' - \Delta L''\right)}{m} +$$

$$\frac{n' \times \Delta L'}{m} + \frac{n_{CTE} \times \left(\frac{\Delta L}{2} + \Delta L''\right)}{m}$$

AWG transmission center wavelength difference (TE-TM):

$$\lambda_{TE} - \lambda_{TM} = \frac{(n_{CTM} - n_{CTE})}{m} \times (\Delta L' + 2 \times \Delta L'')$$

The polarization dependence eliminating means can adjust $\Delta L''$. Accordingly, the polarization dependence eliminating means adjusts $\Delta L''$ so as to satisfy the equation: $\Delta L' + 2 \times \Delta L'' = 0$. In this manner, the arrayed waveguide grating optical multiplexer/demultiplexer can eliminate the temperature dependence and the polarization dependence at the same time, and reduce the influence of PDL.

Specifically, the polarization dependence eliminating means eliminates the overall polarization dependence by satisfying the following equation: $\Delta L'' = -\Delta L'/2$.

In a case where the temperature-dependence compensator is provided on the input slab waveguide or the output slab waveguide as shown in FIG. 5, the AWG transmission wavelength difference is expressed by the mathematical equation 7:

AWG transmission center wavelength (TE): $\lambda_{TE} =$ [Equation 7]

$$\frac{n_{CTE} \times \left(\frac{\Delta L}{2} - \Delta L''\right)}{m} + \frac{n' \times \Delta L'}{m} -$$

$$\frac{n_{STE} \times \Delta L'}{m} + \frac{n_{CTM} \times \left(\frac{\Delta L}{2} + \Delta L''\right)}{m}$$

AWG transmission center wavelength (TM): $\lambda_{TM} =$ $$\frac{n_{CTM} \times \left(\frac{\Delta L}{2} - \Delta L''\right)}{m} + \frac{n' \times \Delta L'}{m} -$$

$$\frac{n_{STM} \times \Delta L'}{m} + \frac{n_{CTE} \times \left(\frac{\Delta L}{2} + \Delta L''\right)}{m}$$

AWG transmission center wavelength difference (TE-TM): $\lambda_{TE} - \lambda_{TM} =$ $$\frac{2 \times (n_{CTM} - n_{CTE}) \times \Delta L'' + (n_{STM} - n_{STE}) \times \Delta L'}{m}$$

The polarization dependence eliminating means adjusts $\Delta L''$ so as to satisfy the following equation: $(n_{STM} - n_{STE}) \times \Delta L' + 2 \times (n_{CTM} - n_{CTE}) \times \Delta L'' = 0$. Accordingly, the arrayed waveguide grating optical multiplexer/demultiplexer can eliminate the temperature dependence and the polarization dependence at the same time, and reduce the influence of PDL.

Specifically, the polarization dependence eliminating means eliminates the overall polarization dependence by satisfying the following equation: $\Delta L'' = -A \times \Delta L'/2$, wherein $A = (n_{STM} - n_{STE})/(n_{CTM} - n_{CTE})$.

The polarization dependence eliminating means of the arrayed waveguide grating optical multiplexer/demultiplexer according to the present invention is placed at a predetermined angle with respect to the optical axis of each channel waveguide of the arrayed waveguide.

As the angle of the polarization dependence eliminating means with respect to the optical axis of each channel waveguide of the arrayed waveguide is adjusted, the arrayed waveguide grating optical multiplexer/demultiplexer can eliminate the temperature dependence and the polarization dependence at the same time, and reduce the influence of PDL. The portion of the arrayed waveguide on which the polarization dependence eliminating means is placed is preferably a straight-line portion or has such low curvature as to become similar to a straight-line portion. With this arrangement, the design for placing the polarization dependence eliminating means becomes easier, and the precision of the asymmetric correction effect can be improved.

The inter-channel difference in refractive index of the channel waveguides in the arrayed waveguide of the arrayed waveguide grating optical multiplexer/demultiplexer according to the present invention has polarization dependence, and the polarization dependence eliminating means may deviate from the center of the arrayed waveguide toward the input slab waveguide or the output slab waveguide.

In the following description, the inter-channel differences in refractive index of the respective channel waveguides in the arrayed waveguide will be referred to as the refractive index differences among the waveguides. Where the refractive index differences among the waveguides have polarization dependence, a polarization dependence of the transmission wavelength can be eliminated by moving the position of the polarization dependence eliminating means from the center toward the input slab waveguide or the output slab waveguide. Where there is not a temperature-dependence compensator as in FIG. 8, the AWG transmission center wavelength difference is expressed by the mathematical equation 8:

$$AWG \text{ transmission center wavelength } (TE): \lambda_{TE} = \quad \text{[Equation 8]}$$
$$\frac{1}{2} \times \frac{n_{CTE} \times \Delta L}{m} + \frac{L_{Left} \times \Delta n_{CTE}}{m} + \frac{L_{Right} \times \Delta n_{CTM}}{m} + \frac{1}{2} \times \frac{n_{CTM} \times \Delta L}{m}$$

$$AWG \text{ transmission center wavelength } (TM): \lambda_{TM} =$$
$$\frac{1}{2} \times \frac{n_{CTM} \times \Delta L}{m} + \frac{L_{Left} \times \Delta n_{CTM}}{m} + \frac{L_{Right} \times \Delta n_{CTE}}{m} + \frac{1}{2} \times \frac{n_{CTE} \times \Delta L}{m}$$

$$AWG \text{ transmission center wavelength difference } (TE\text{-}TM): \lambda_{TE} - \lambda_{TM} =$$
$$\frac{(L_{Left} - L_{Right}) \times \Delta n_{CTE} + (L_{Right} - L_{Left}) \times \Delta n_{CTM}}{m}$$

Here, $\Delta n_{CTE}$ represents the refractive index of the TE-mode difference among the waveguides, $\Delta n_{CTM}$ represents the refractive index of the TM-mode difference among the waveguides, $L_{Left}$ represents the length of part of the straight-line portion of the arrayed waveguide on the left side of the polarization dependence eliminating means, and $L_{Right}$ represents the length of part of the straight-line portion of the arrayed waveguide on the right side of the polarization dependence eliminating means.

If $L_{Left}$ is equal to $L_{Right}$ in the mathematical equation 8, the AWG transmission center wavelength difference becomes zero. If $L_{Left}$ is not equal to $L_{Right}$ an AWG transmission center wavelength difference that corresponds to $L_{Left} - L_{Right}$ is caused. By using this phenomenon, the arrayed waveguide grating optical multiplexer/demultiplexer can be made independent of polarization.

Next, an arrayed waveguide grating optical multiplexer/demultiplexer in which the temperature-dependence compensator is placed on the input slab waveguide as shown in FIG. 9 is described. In this case, the AWG transmission center wavelength difference is expressed by the mathematical equation 9:

$$AWG \text{ transmission center wavelength } (TE): \lambda_{TE} = \quad \text{[Equation 9]}$$
$$\frac{1}{2} \times \frac{n_{CTE} \times \Delta L}{m} + \frac{n' \times \Delta L'}{m} - \frac{n_{STE} \times \Delta L'}{m} + \frac{L_{Left} \times \Delta n_{CTE}}{m} + \frac{L_{Right} \times \Delta n_{CTM}}{m} + \frac{1}{2} \times \frac{n_{CTM} \times \Delta L}{m}$$

$$AWG \text{ transmission center wavelength } (TM): \lambda_{TM} =$$
$$\frac{1}{2} \times \frac{n_{CTM} \times \Delta L}{m} + \frac{n' \times \Delta L'}{m} - \frac{n_{STM} \times \Delta L'}{m} + \frac{L_{Left} \times \Delta n_{CTM}}{m} + \frac{L_{Right} \times \Delta n_{CTE}}{m} + \frac{1}{2} \times \frac{n_{CTE} \times \Delta L}{m}$$

$$AWG \text{ transmission center wavelength difference } (TE\text{-}TM): \lambda_{TE} - \lambda_{TM} =$$
$$\frac{(n_{STM} - n_{STE}) \times \Delta L' + (L_{Left} - L_{Right}) \times \Delta n_{CTE} - (L_{Left} - L_{Right}) \times \Delta n_{CTM}}{m}$$

To make the AWG transmission center wavelength difference zero, $L_{Left}$ and $L_{Right}$ are adjusted. More specifically, the position of the polarization dependence eliminating means is adjusted according to the mathematical equation 10, so that the overall polarization dependence of each channel extending from the input slab waveguide to the output slab waveguide can be eliminated by the polarization dependence eliminating means and the polarization dependence of the refractive index difference among the waveguides. Accordingly, the arrayed waveguide grating optical multiplexer/demultiplexer can eliminate the temperature dependence and the polarization dependence at the same time, and can reduce the influence of PDL. Further, the portion of the arrayed waveguide on which the polarization dependence eliminating means is placed is preferably a straight-line portion or has such low curvature as to become similar to a straight-line portion. The design for placing the polarization dependence eliminating means becomes easier, and the precision of the asymmetric correction effect can be improved.

$$L_{Left} - L_{Right} = \frac{(n_{STM} - n_{STE}) \times \Delta L'}{\Delta n_{CTM} - \Delta n_{CTE}} \quad \text{[Equation 10]}$$

The polarization dependence of the refractive index differences among the waveguides is caused, because the channel waveguide pitch in the arrayed waveguide varies in the vicinity of the polarization dependence eliminating mean. Where the channel waveguide pitch at the straight-line portion of the arrayed waveguide is not uniform, the internal residual stress caused in the process of cooling from a high temperature to room temperature during the manufacture slightly varies among the channel waveguides, and as a result, refractive index varies.

Here, a Mach-Zehnder interferometer of a waveguide type optical device is also described. FIG. 10 is a view for explaining the structure of a Mach-Zehnder interferometer 110. To eliminate both the polarization dependence and the temperature dependence of a Mach-Zehnder interferometer, a temperature-dependence compensator 27 is placed on the right side or left side of a polarization dependence eliminating means 17, as in the Mach-Zehnder interferometer 110 of FIG. 10. The transmission wavelength of the Mach-Zehnder interferometer 110 is expressed by the mathematical equation 11. Hereinafter, a Mach-Zehnder interferometer will be sometimes referred to as MZI.

$$MZI \text{ transmission center wavelength } (TE): \lambda_{TE} = \quad \text{[Equation 11]}$$
$$\frac{n_{CTE} \times \left(\frac{\Delta L}{2} - \Delta L'\right)}{m} + \frac{n' \times \Delta L'}{m} + \frac{n_{CTM} \times \frac{\Delta L}{2}}{m}$$

-continued

MZI transmission center wavelength (TM): $\lambda_{TM} =$ $$\underbrace{\frac{n_{CTM} \times \left(\frac{\Delta L}{2} - \Delta L'\right)}{m}}_{\substack{\text{Left side of MZI} \\ \text{(including the temperature} \\ \text{-dependence compensator} \\ \text{inserting portion)}}} + \underbrace{\frac{n' \times \Delta L'}{m}}_{\substack{\text{Temperature} \\ \text{-dependence} \\ \text{compensator} \\ \text{inserting portion}}} + \underbrace{\frac{n_{CTE} \times \frac{\Delta L}{2}}{m}}_{\text{Right side of MZI}}$$

MZI transmission center wavelength difference $$(TE\text{-}TM): \lambda_{TE} - \lambda_{TM} = \frac{(n_{CTM} - n_{CTE}) \times \Delta L'}{m}$$

Here, $\Delta L$ represents the difference between the waveguide length L1 of an arm 1 and the waveguide length L2 of an arm 2 ($\Delta L = L1 - L2$), and $\Delta L'$ represents the difference between the temperature compensating means length L1' in the arm 1 and the temperature compensating means length L2' of the arm 2 ($\Delta L' = L1' - L2'$). Further, $n_{CTE}$ represents the effective refractive index of the arm waveguide of the TE mode, and $n_{CTM}$ represents the effective refractive index of the arm waveguide of the TM mode. The arm 1 and the arm 2 form two channel waveguides.

As in the mathematical equation 11, in the Mach-Zehnder interferometer, a wavelength difference equivalent to product of the refractive index difference in arm and the difference in path length of the compensating means is also caused between the polarization modes by the temperature-dependence compensator placed on the arm on the left side of the polarization dependence eliminating means.

Therefore, in the Mach-Zehnder interferometer, the polarization dependence eliminating means that eliminates the overall polarization dependence is also inserted to the two channel waveguides.

Specifically, according to the present invention, there is provided a Mach-Zehnder interferometer including: at least one input channel waveguide formed on a waveguide substrate; a first coupler connected to the input channel waveguide; two channel waveguides connected to the first coupler; a polarization dependence eliminating means provided on the two channel waveguides; a second coupler connected to the two channel waveguides; a temperature-dependence compensator that is provided on at least one of the two channel waveguides, and compensates for temperature dependence of an optical path length difference between the two channel waveguides; and at least one output channel waveguide connected to the second coupler, wherein the polarization dependence eliminating means eliminates polarization dependence of each channel from the first coupler to the second coupler.

As the polarization dependence eliminating means eliminates the overall polarization dependence of each channel extending from the first coupler to the second coupler, the Mach-Zehnder interferometer can eliminate the temperature dependence and the polarization dependence at the same time, and reduce the influence of PDL. Since the polarization dependence eliminating means eliminates the overall polarization dependence, the Mach-Zehnder interferometer can reduce the influence of PDL, even if the temperature-dependence compensator causes polarization dependence.

The polarization dependence eliminating means compensates for the optical path length difference between the polarization modes on the first coupler side of the polarization dependence eliminating mean by the optical path length difference between the polarization modes on the second coupler side of the polarization dependence eliminating means.

By making this compensation, the polarization dependence eliminating mean can eliminate the overall polarization dependence.

Where $\Delta L'$ represents the inter-channel difference in length of the inserted portion of the temperature-dependence compensator, and $\Delta L''$ represents the asymmetric correction length to be used by the polarization dependence eliminating means to correct the inter-channel difference in length from the first coupler or the second coupler to the polarization dependence eliminating means, the MZI transmission center wavelength difference is expressed by the mathematical equation 12:

MZI transmission center wavelength (TE): $\lambda_{TE} =$ [Equation 12]

$$\frac{n_{CTE} \times \left(\frac{\Delta L}{2} - \Delta L' - \Delta L''\right)}{m} +$$

$$\frac{n' \times \Delta L'}{m} + \frac{n_{CTM} \times \left(\frac{\Delta L}{2} + \Delta L''\right)}{m}$$

MZI transmission center wavelength (TM): $\lambda_{TM} =$ $$\underbrace{\frac{n_{CTM} \times \left(\frac{\Delta L}{2} - \Delta L' - \Delta L''\right)}{m}}_{\substack{\text{Left side of MZI} \\ \text{(including the temperature} \\ \text{-dependence compensator} \\ \text{inserting portion)}}} +$$

$$\underbrace{\frac{n' \times \Delta L'}{m}}_{\substack{\text{Temperature} \\ \text{-dependence} \\ \text{compensator} \\ \text{inserting portion}}} + \underbrace{\frac{n_{CTE} \times \left(\frac{\Delta L}{2} + \Delta L''\right)}{m}}_{\text{Right side of MZI}}$$

MZI transmission center wavelength difference $(TE\text{-}TM): \lambda_{TE} - \lambda_{TM} =$ $$\frac{(n_{CTM} - n_{CTE})}{m} \times (\Delta L' + 2 \times \Delta L'')$$

As indicated by the mathematical equation 12, the polarization dependence eliminating means can eliminate the overall polarization dependence by satisfying the following equation: $\Delta L'' = -\Delta L'/2$. Specifically, as the polarization dependence eliminating means is placed at a predetermined angle with respect to the optical axes of the two channel waveguides, the overall polarization dependence can be eliminated.

Effects of the Invention

The present invention has been made to solve the above problems, and provides an arrayed waveguide grating optical multiplexer/demultiplexer that can eliminate the temperature dependence and the polarization dependence at the same time, and reduce the influence of PDL.

EXPLANATION OF REFERENCE NUMERALS

Figure 1:
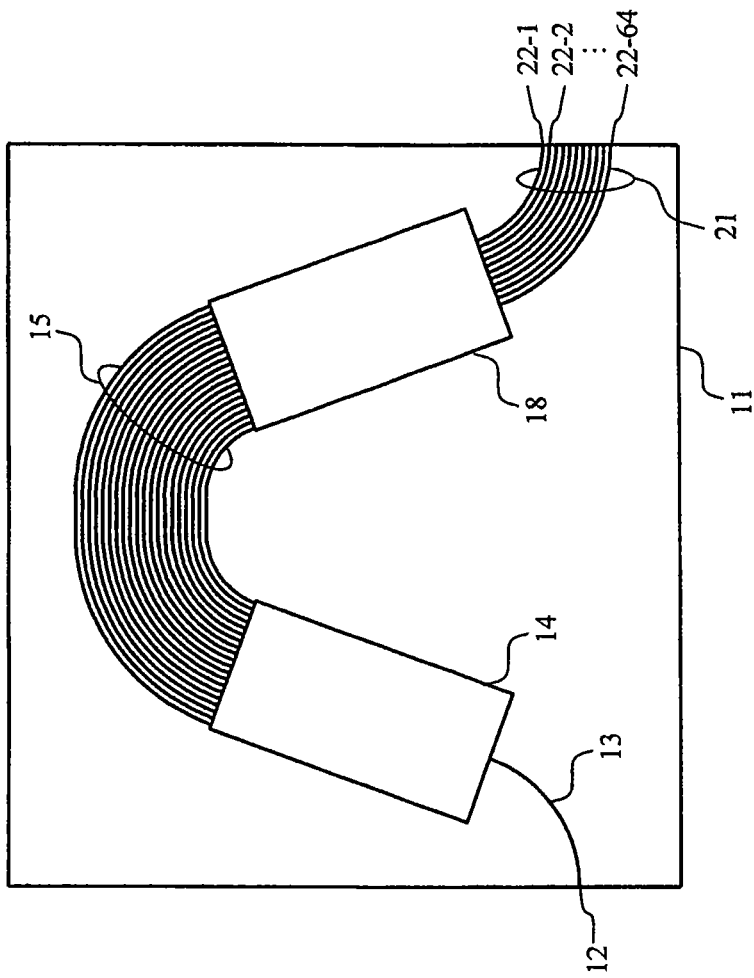
FIG. 1 is a schematic structural view of a conventional arrayed waveguide grating optical multiplexer/demultiplexer.

| | |
|---|---|
| 101 to 109: | Arrayed waveguide grating optical multiplexer/demultiplexer |
| 110, 111: | Mach-Zehnder interferometer |
| 11: | Waveguide substrate |
| 12: | Input port |
| 13: | Input channel waveguide |
| 14: | Input slab waveguide |
| 15: | Arrayed waveguide |
| 15a: | Straight-line portion |
| 16, 19, 26: | Groove |
| 17: | Polarization dependence eliminating means |
| 18: | Output slab waveguide |
| 21: | Output channel waveguide |
| 22-1 to 64: | Output port |
| 27, 27-1, 27-2: | Temperature-dependence compensator |
| 34: | First coupler |
| 35-1, 35-2: | Channel waveguide |
| 38: | Second coupler |

BEST MODE FOR CARRYING OUT THE INVENTION

Embodiments of the present invention will be described with reference to the accompanying drawings. The embodiments described below are merely examples of structures according to the present invention, and the present invention is not limited to those embodiments. In this specification and the drawings, like components are denoted by like reference numerals.

First Embodiment

Figure 6:
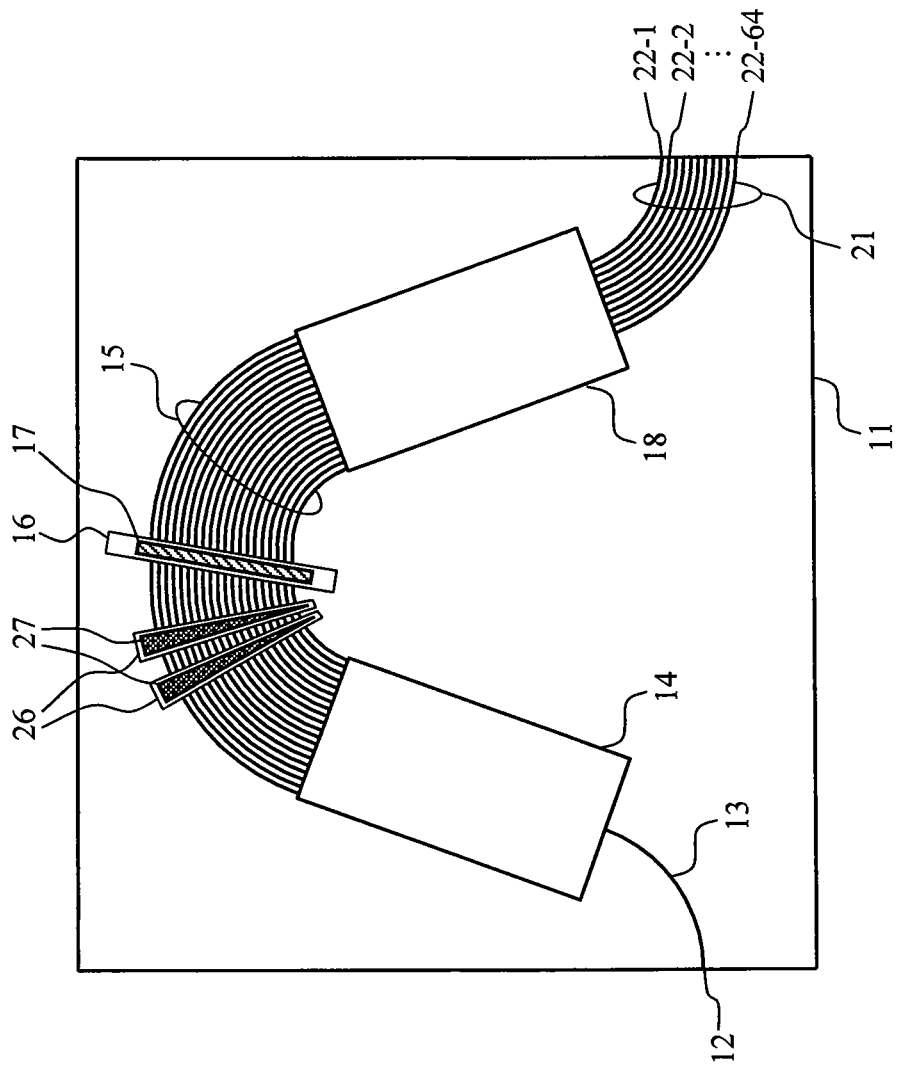
FIG. 6 is a schematic structural view of an arrayed waveguide grating optical multiplexer/demultiplexer according to the present invention.

In the following, a mode for carrying out the present invention is described with reference to a drawing. FIG. 6 shows the structure of an arrayed waveguide grating optical multiplexer/demultiplexer 106 of this embodiment. This embodiment is characterized in that a polarization dependence eliminating means inserted to the arrayed waveguide eliminates the polarization dependence due to birefringence of the arrayed waveguide and a temperature-dependence compensator. In the following, this structure is described in detail with reference to the drawing.

FIG. 6 is a schematic view of the arrayed waveguide grating optical multiplexer/demultiplexer 106. As shown in FIG. 6, the arrayed waveguide grating optical multiplexer/demultiplexer 106 is formed with a silica-based waveguide on a waveguide substrate 11 that is made of silicon. The silica-based waveguide includes: at least one input channel waveguide 13 that is connected to an input port 12; an input slab waveguide 14 that is connected to the input channel waveguide 13; an arrayed waveguide 15 that is formed with a plurality of channel waveguides connected to the input slab waveguide 14; a polarization dependence eliminating mean 17 that is provided on the arrayed waveguide 15; an output slab waveguide 18 that is connected to the arrayed waveguide 15; a temperature-dependence compensator 27 that is provided on the arrayed waveguide 15 on the input slab waveguide 14 side of the polarization dependence eliminating mean 17; and at least one output channel waveguide 21 that is connected to the output slab waveguide 18. The temperature-dependence compensator 27 may be located on the side of the output slab waveguide 18, instead of on the arrayed waveguide 15 on the input slab waveguide 14 side of the polarization dependence eliminating means 17.

The arrayed waveguide grating optical multiplexer/demultiplexer 106 has two grooves 26 that extend across the arrayed waveguide 15. The number of grooves 26 is not limited to two. The grooves 26 are designed to have the smallest width on the channel waveguide of the smallest optical path length of the arrayed waveguide 15, and have the greatest width on the channel waveguide of the greatest optical path length. The temperature-dependence compensator 27 is inserted into the grooves 26. The temperature-dependence compensator 27 compensates for the temperature dependence of the optical path length differences among the channel waveguides of the arrayed waveguide 15. The temperature-dependence compensator 27 is a material that has a thermal coefficient of refractive index of a different sign from the channel waveguides. For example, the temperature-dependence compensator 27 is silicone resin.

The arrayed waveguide grating optical multiplexer/demultiplexer 106 has a groove 16 that extends obliquely across the arrayed waveguide 15. The polarization dependence eliminating means 17 is inserted to this groove 16. The polarization dependence eliminating means 17 is a polarization mode converter that converts a TM mode that is an electric field perpendicular to the waveguide substrate 11, and a TE mode that is an electric field parallel to the waveguide substrate 11 each other. For example, the polarization dependence eliminating means 17 is a polyimide-based half-wave plate that has its major axis tilted 45° to the waveguide substrate 11. Where the major axis of a half-wave plate is tilted 45° to a waveguide substrate, the TM mode of light incident on the half-wave plate is converted into the TE mode, and the TE mode is converted into the TM mode and then output.

Figure 2:
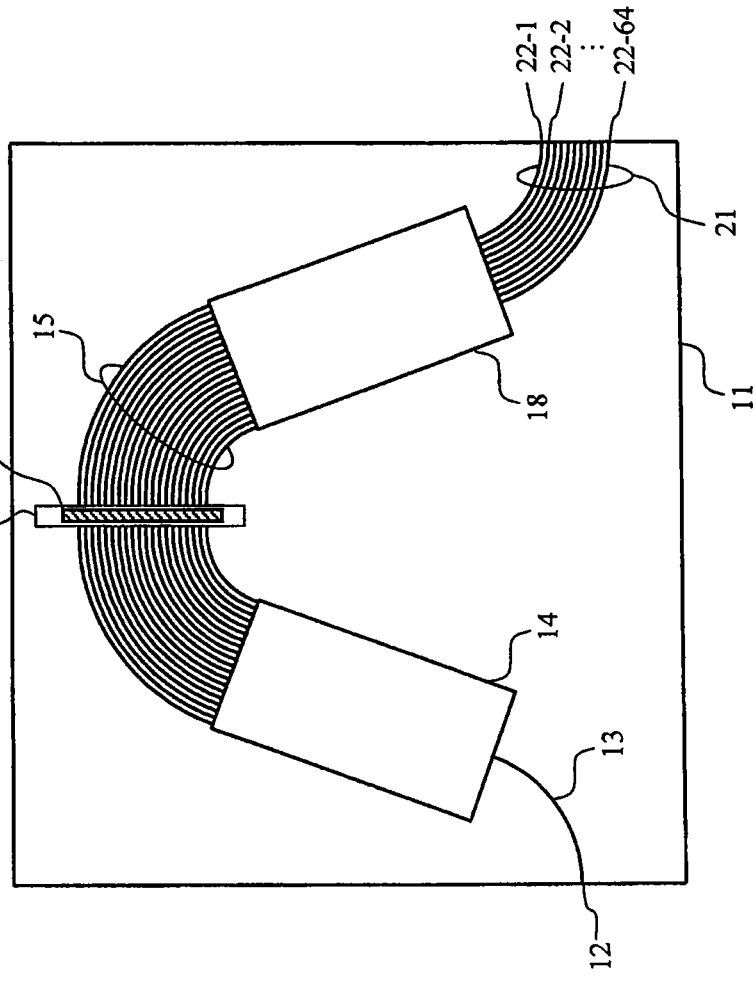
FIG. 2 is a schematic structural view of a conventional arrayed waveguide grating optical multiplexer/demultiplexer.
Figure 3:
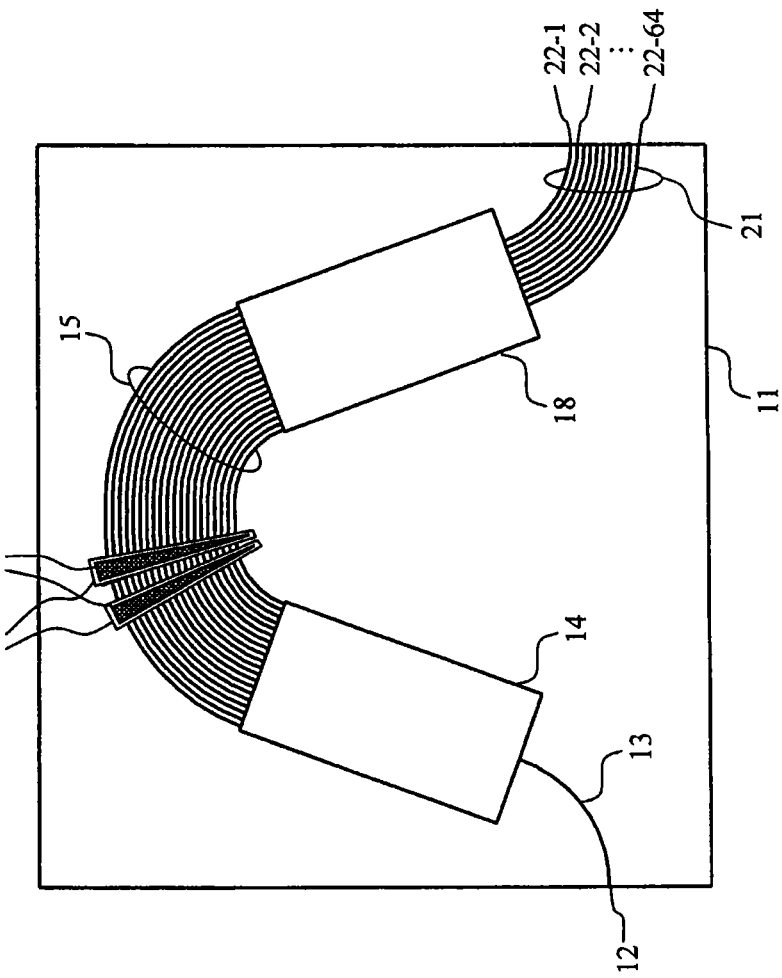
FIG. 3 is a schematic structural view of a conventional arrayed waveguide grating optical multiplexer/demultiplexer.
Figure 4:
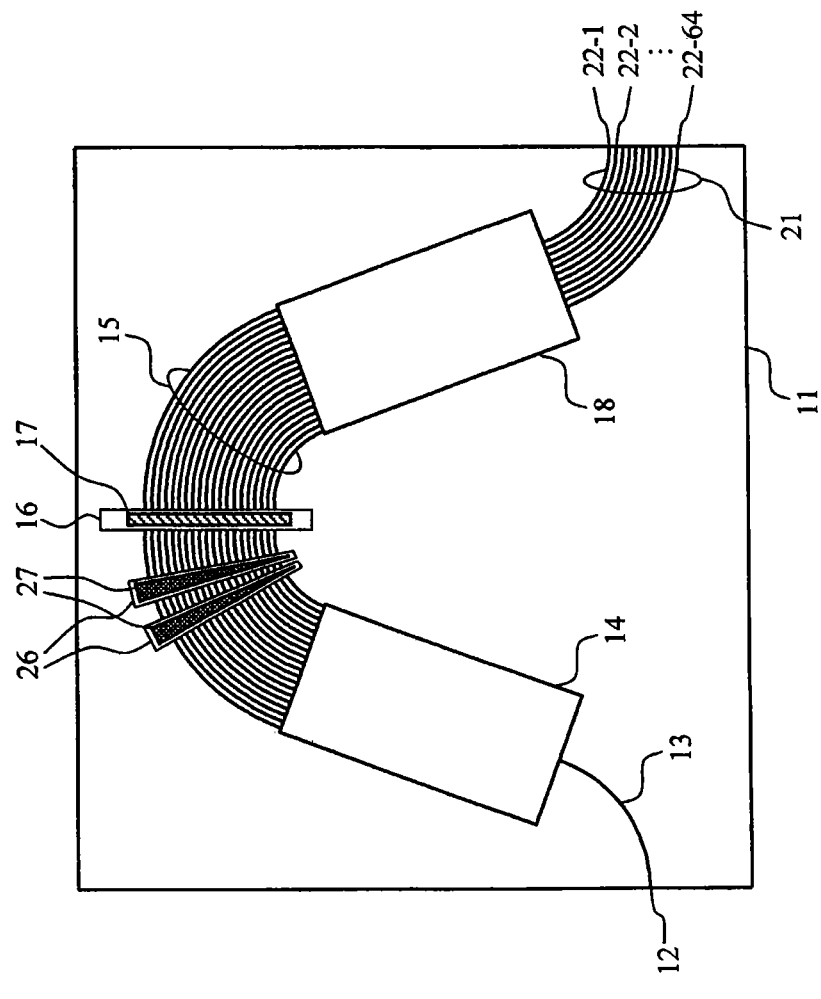
FIG. 4 is a schematic structural view of a conventional arrayed waveguide grating optical multiplexer/demultiplexer.

If the polarization dependence eliminating means 17 is placed perpendicularly to the channel waveguides of the arrayed waveguide 15 as shown in FIG. 2, the polarization dependence eliminating means 17 can eliminate the polarization dependence due to the waveguide birefringence of the arrayed waveguide 15 as explained with reference to the mathematical equation 2. In the arrayed waveguide grating optical multiplexer/demultiplexer 106, on the other hand, the temperature-dependence compensator 27 is inserted to the grooves 26 of the arrayed waveguide 15, and the length of the arrayed waveguide 15 is shortened by the length of the portion to which the temperature-dependence compensator 27 is inserted. Therefore, the lengths of the channel waveguides vary between the side of the input slab waveguide 14 and the side of the output slab waveguide 18 of the polarization dependence eliminating means 17, and the polarization dependence eliminating mean 17 cannot eliminate the polarization dependence.

Therefore, in the arrayed waveguide grating optical multiplexer/demultiplexer 106, the polarization dependence eliminating means 17 is provided obliquely on the channel waveguides of the arrayed waveguide 15 via the groove 16. Since the pitches between the channel waveguides of the arrayed waveguide 15 are substantially uniform, the polarization dependence eliminating means 17 can compensate for the optical path length difference between the polarization modes of the input slab waveguide 14 side of the polarization dependence eliminating means 17 by the optical path length difference between the polarization modes of the output slab waveguide 18 side of the polarization dependence eliminating means 17.

More specifically, the polarization dependence eliminating means 17 can adjust the asymmetric correction length $\Delta L''$ explained with reference to the mathematical equation 6, using the angle with respect to the channel waveguides of the arrayed waveguide 15. Where the asymmetric correction length $\Delta L''$ to be used by the polarization dependence eliminating means 17 to correct the inter-channel differences in length from the input slab waveguide 14 to the polarization dependence eliminating means 17 on the input slab waveguide 14 side of the polarization dependence eliminating means 17, the asymmetric correction length to be used by the polarization dependence eliminating means 17 to correct the inter-channel differences in length from the output slab waveguide 18 to the polarization dependence eliminating means 17 on the output slab waveguide 18 side of the polarization dependence eliminating means 17 is $-\Delta L''$. Accordingly, by placing the polarization dependence eliminating means 17 at such an angle to satisfy the equation, $\Delta L''=-\Delta L'/2$, the polarization dependence of each channel from the input slab waveguide 14 to the output slab waveguide 18 can be eliminated.

Hereinafter, the elimination of the polarization dependence of each channel extending from the input slab waveguide to the output slab waveguide where the polarization dependence eliminating means 17 is obliquely placed will be referred to as the "asymmetric correction".

A specific example is an arrayed waveguide grating optical multiplexer/demultiplexer that has a temperature-dependence compensator located in a position in the arrayed waveguide on the side of the input slab waveguide. In this arrayed waveguide grating optical multiplexer/demultiplexer, the number of channels is 40, the number of waveguides in the arrayed waveguide is 250 at a channel pitch of 0.8 nm, $\Delta L$ is 50 µm, $\Delta L'$ is 1.25 µm, and the channel waveguide pitch in the arrayed waveguide 15 is 20 µm. A temperature-dependence compensator is formed by forming a groove in the waveguide, and the groove is filled with silicone resin. The groove is divided into four, and is located at a position of the arrayed waveguide 15. In this arrayed waveguide grating optical multiplexer/demultiplexer, the angle θ at which the effect of the asymmetric correction is achieved is expressed as: 0°>θ>−3.6°. The optimum value of the angle θ at which the effect of the asymmetric correction is achieved is −1.8°.

Accordingly, the arrayed waveguide grating optical multiplexer/demultiplexer 106 can eliminate the temperature dependence and the polarization dependence at the same time, and reduce the influence of PDL. The vicinity portion of the arrayed waveguide 15 on which the polarization dependence eliminating mean 17 is placed is preferably a straight-line portion, or has such low curvature that the portion becomes similar to a straight-light portion. The design for placing the polarization dependence eliminating means 17 becomes easier, and the precision of the asymmetric correction effect can be improved.

Second Embodiment

Figure 7:
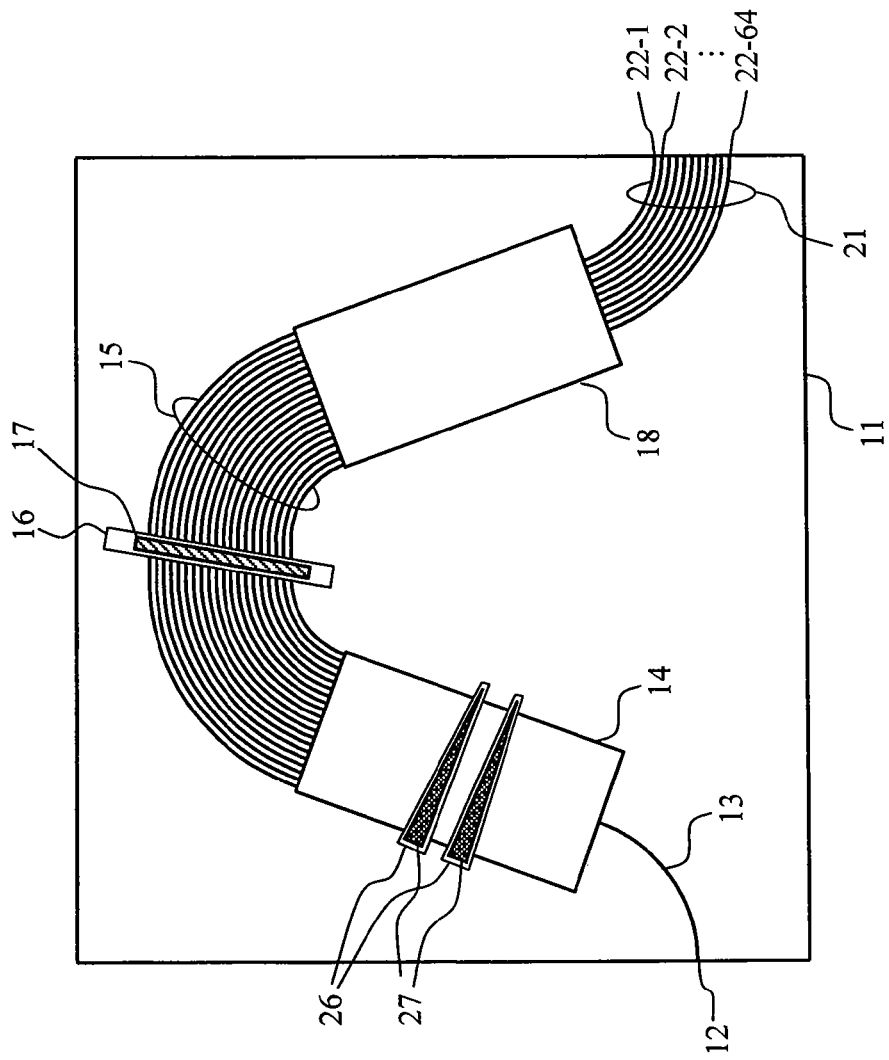
FIG. 7 is a schematic structural view of an arrayed waveguide grating optical multiplexer/demultiplexer according to the present invention.
Figure 8:
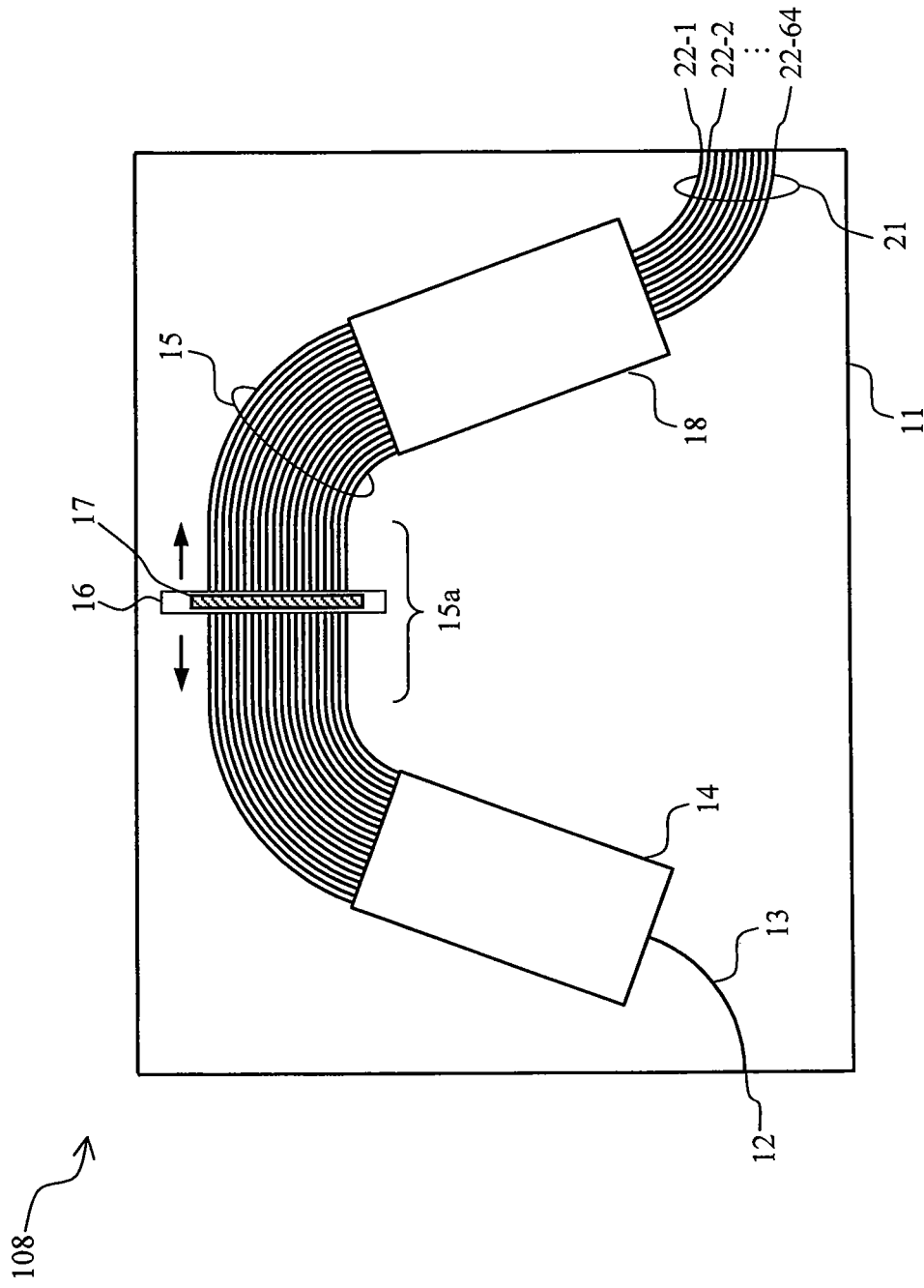
FIG. 8 is a schematic structural view of an arrayed waveguide grating optical multiplexer/demultiplexer according to the present invention.

FIG. 7 is a schematic view of an arrayed waveguide grating optical multiplexer/demultiplexer 107. The difference between the arrayed waveguide grating optical multiplexer/demultiplexer 107 and the arrayed waveguide grating optical multiplexer/demultiplexer 106 of FIG. 6 is that the temperature-dependence compensator 27 is placed on the input slab waveguide 14, instead of the arrayed waveguide 15. Alternatively, the temperature compensating means 27 may be placed on the output slab waveguide 18, instead of the input slab waveguide 14.

The arrayed waveguide grating optical multiplexer/demultiplexer 107 has two grooves 26 extending across the input slab waveguide 14. The number of grooves 26 is not limited to two. The grooves 26 are designed to have smaller width on the inner side of the curved arrayed waveguide 15, and have greater width on the outer side. The temperature compensating means 27 is inserted into the grooves 26, as in the arrayed waveguide grating optical multiplexer/demultiplexer 106 of FIG. 6.

Figure 5:
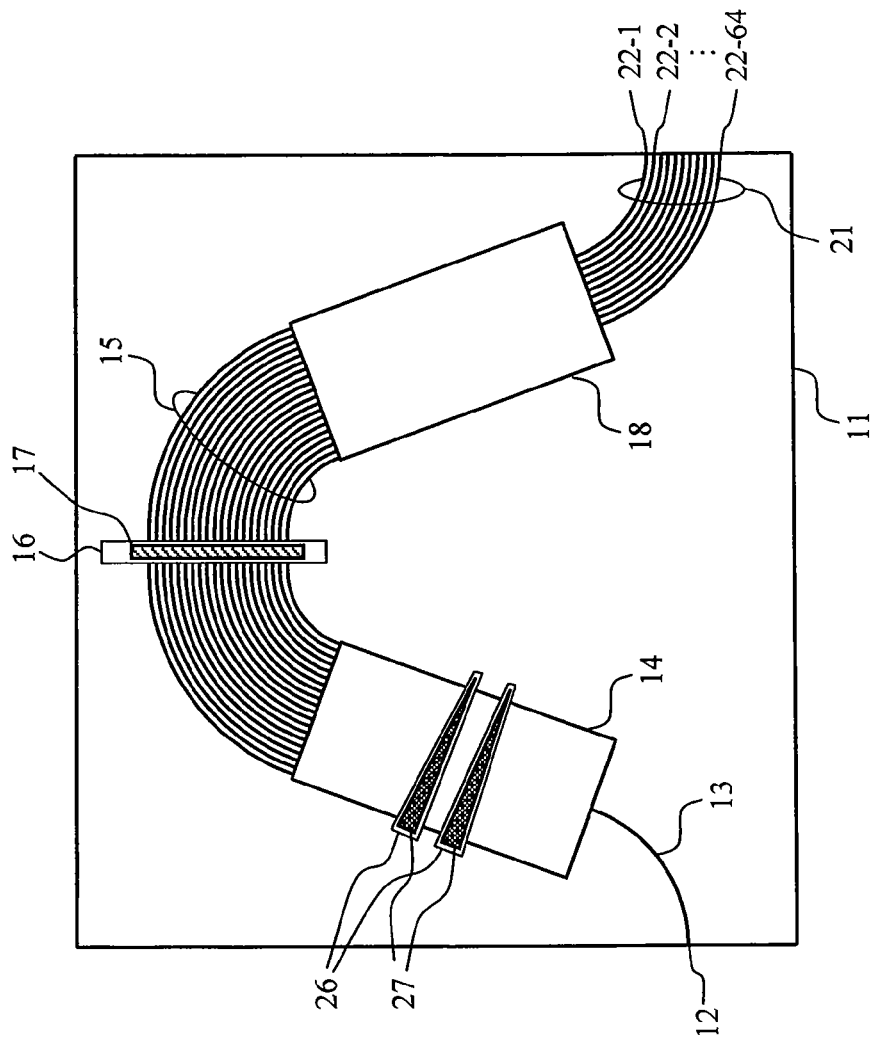
FIG. 5 is a schematic structural view of an arrayed waveguide grating optical multiplexer/demultiplexer according to the present invention.

If the polarization dependence eliminating means 17 is placed perpendicularly to the channel waveguides of the arrayed waveguide 15 as shown in FIG. 5, an AWG transmission center wavelength difference remains, as explained with reference to the mathematical equation 7. As explained in the description of the arrayed waveguide grating optical multiplexer/demultiplexer 106 of FIG. 6, $\Delta L''$ can be adjusted with the angle of the polarization dependence eliminating means 17 with respect to the channel waveguides of the arrayed waveguide 15. More specifically, the overall polarization dependence of the optical path length of the temperature-dependence compensator each channel waveguide extended from the input to output slab waveguide can be eliminated by placing the polarization dependence eliminating means 17 at such an angle as to satisfy the following equation: $\Delta L''=-A \times \Delta L'/2$ (wherein $A=(n_{STM}-n_{STE})/(n_{CTM}-n_{CTE})$).

Since $n_{CTM}-n_{CTE}$ is approximately 0.0002, and $n_{STM}-n_{STE}$ is approximately 0.0007 in the case of the arrayed waveguide grating optical multiplexer/demultiplexer 107, the asymmetric correction needs to be approximately 3.5 times as large as the asymmetric correction in the case of the arrayed waveguide grating optical multiplexer/demultiplexer 106 of FIG. 6.

Accordingly, the arrayed waveguide grating optical multiplexer/demultiplexer 107 can eliminate the temperature dependence and the polarization dependence, and reduce the influence of PDL. The vicinity portion of the arrayed waveguide 15 on which the polarization dependence eliminating means 17 is placed is preferably a straight-line portion, or has such low curvature that the portion becomes similar to a straight-light portion. The effects described with reference to FIG. 6 can be achieved.

Third Embodiment

Figure 9:
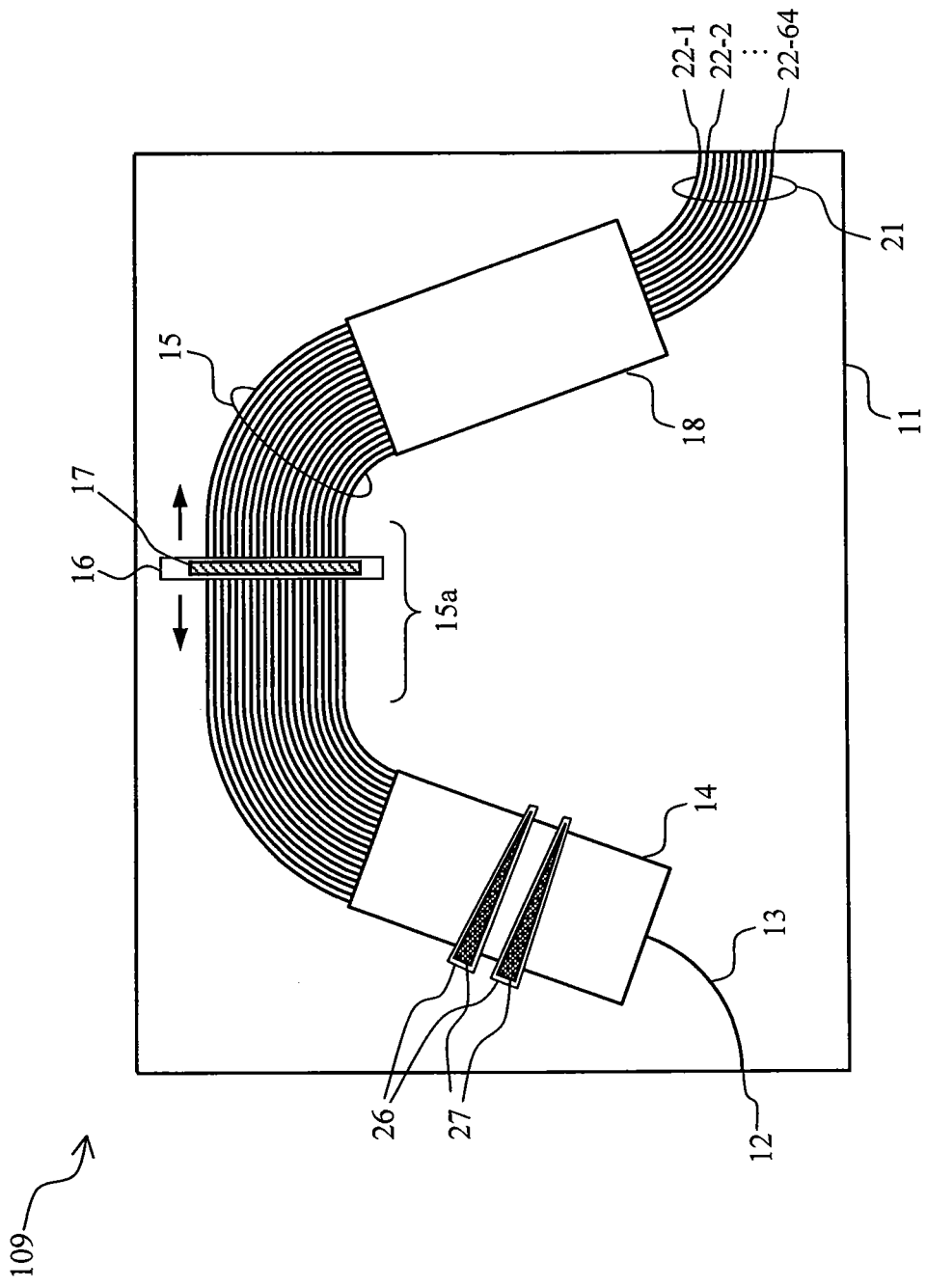
FIG. 9 is a schematic structural view of an arrayed waveguide grating optical multiplexer/demultiplexer according to the present invention.

FIG. 9 is a schematic view of an arrayed waveguide grating optical multiplexer/demultiplexer 109. The differences between the arrayed waveguide grating optical multiplexer/ demultiplexer 109 and the arrayed waveguide grating optical multiplexer/demultiplexer 107 of FIG. 7 are that the polarization dependence eliminating means 17 is not obliquely placed, and is not located at the center of the arrayed waveguide 15. There is a polarization dependence distribution of refractive index at the straight-line portion 15a, and the differences in refractive index among the waveguides have the polarization dependence. More specifically, the channel waveguide pitch is narrower on the shorter waveguide side of the arrayed waveguide 15, and the channel waveguide pitch is wider on the longer waveguide side of the arrayed waveguide 15. For example, the number of waveguides in the arrayed waveguide 15 is 250, the minimum pitch of the channel waveguides of the arrayed waveguide 15 is 15 µm, and the rate of variation of the channel waveguide pitch is 0.1 to 0.2% by waveguide to waveguide.

In the arrayed waveguide grating optical multiplexer/demultiplexer 109, $L_{Left}-L_{Right}$ of the mathematical equation 10 is approximately 3000 µm. Accordingly, the temperature dependence and the polarization dependence can be simultaneously reduced by moving the position of the polarization dependence eliminating means 17 by an amount within the range expressed as: $0<(L_{Left}-L_{Right})/2<3000$ µm. The dependence can be eliminated by moving the position of the polarization dependence eliminating means 17 by approximately 1500 µm. In the arrayed waveguide grating optical multiplexer/demultiplexer 109, the polarization dependence eliminating means 17 is moved toward the output slab waveguide 18 from the center of the arrayed waveguide 15.

In a case where there is a polarization dependence distribution of refractive index at the straight-line portion 15a of the arrayed waveguide 15 in the vicinity of the insertion position of the polarization dependence eliminating means 17, and the differences in refractive index among the waveguides have the polarization dependence as in the arrayed waveguide grating optical multiplexer/demultiplexer 109, the same effects as those of the arrayed waveguide grating optical multiplexer/demultiplexer 107 of FIG. 7 can be achieved by moving the position of the polarization dependence eliminating means 17 toward the input slab waveguide 14 or the output slab waveguide 18 from the center of the arrayed waveguide 15, without placing the polarization dependence eliminating means 17 in an oblique manner.

In the arrayed waveguide grating optical multiplexer/demultiplexer 109, the temperature-dependence compensator 27 is placed on the input slab waveguide 14. However, even if the temperature-dependence compensator 27 is placed on the output slab waveguide 18 or on the arrayed waveguide 15 as in the arrayed waveguide grating optical multiplexer/demultiplexer 106 of FIG. 6, the temperature dependence and the polarization dependence can be eliminated at the same time, and the influence of PDL can be reduced. Further, the arrayed waveguide 15 of the arrayed waveguide grating optical multiplexer/demultiplexer 109 has the straight-line portion 15a. However, even if the straight-line portion 15a does not exist, the same effects as above can be achieved by moving the position of the polarization dependence eliminating means 17 toward the input slab waveguide 14 or the output slab waveguide 18 from the center of the arrayed waveguide 15.

Fourth Embodiment

Figure 10:
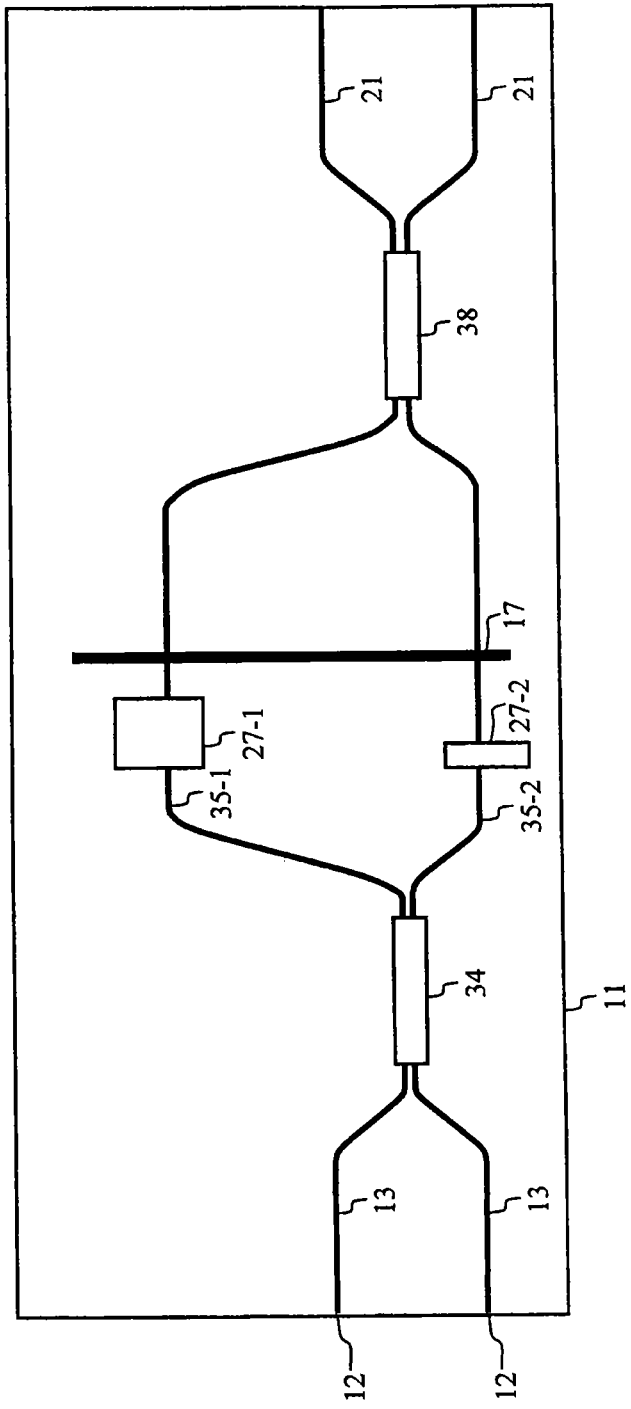
FIG. 10 is a schematic structural view of a conventional Mach-Zehnder interferometer.

FIG. 10 is a schematic view of a Mach-Zehnder interferometer 110. The Mach-Zehnder interferometer 110 is formed with a silica-based waveguide on the waveguide substrate 11. The silica-based waveguide includes: at least one input channel waveguide 13; a first coupler 34 that is connected to the input channel waveguide 13; two channel waveguides (35-1, 35-2) that are connected to the first coupler 34; a polarization dependence eliminating means 17 that is provided on the two channel waveguides (35-1, 35-2); a second coupler 38 that is connected to the two channel waveguides (35-1, 35-2); temperature-dependence compensator (27-1, 27-2) that are provided on the two channel waveguides (35-1, 35-2), respectively, and compensates for the temperature dependence of the optical path length differences in the two channel waveguides (35-1, 35-2); and at least one output channel waveguide 21 that is connected to the second coupler 38.

The first coupler 34 and the second coupler 38 are directional couplers or multimode interferometers, for example. The temperature-dependence compensator (27-1, 27-2) may not be located on the channel waveguides (35-1, 35-2) on the first couple 34 side of the polarization dependence eliminating means 17, but may be located on the second coupler 38 side of the polarization dependence eliminating means 17.

Although not shown in FIG. 10, the temperature-dependence compensator (27-1, 27-2) may be inserted to grooves formed in the waveguide substrate 11 as described with reference to FIG. 6. The temperature-dependence compensator (27-1, 27-2) are temperature compensating means that have a thermal coefficient of refractive index of a different sign from the channel waveguides as explained with reference to FIG. 6. For example, the temperature-dependence compensator (27-1, 27-2) are silicone resin.

The Mach-Zehnder interferometer 110 may have a groove extending across both of the channel waveguides (35-1, 35-2), and the polarization dependence eliminating means 17 may be inserted to the groove, as explained with reference to FIG. 6.

Where the polarization dependence eliminating means 17 is placed perpendicularly to the channel waveguides (35-1, 35-2) as shown in FIG. 10, the polarization dependence can be eliminated due to the waveguide birefringence of the channel waveguides (35-1, 35-2), as indicated by the mathematical equation 2 explained in the description of AWG. In the Mach-Zehnder interferometer 110, however, the temperature-dependence compensator (27-1, 27-2) are inserted to the channel waveguides (35-1, 35-2), respectively, and the lengths (L1, L2) of the channel waveguides (35-1, 35-2) are reduced by the lengths (L1', L2') of the inserted portions of the temperature compensating means (27-1, 27-2). Therefore, the difference in channel waveguide length between the first couple 34 side of the polarization dependence eliminating means 17 and the second coupler 38 side of the polarization dependence eliminating means 17 is $\Delta L'=L1'-L2'$. Since a difference is caused in the MZI transmission center wavelength as indicated by $\Delta L'$ in the mathematical equation 11, the polarization dependence cannot be eliminated by a conventional polarization dependence eliminating means.

Figure 11:
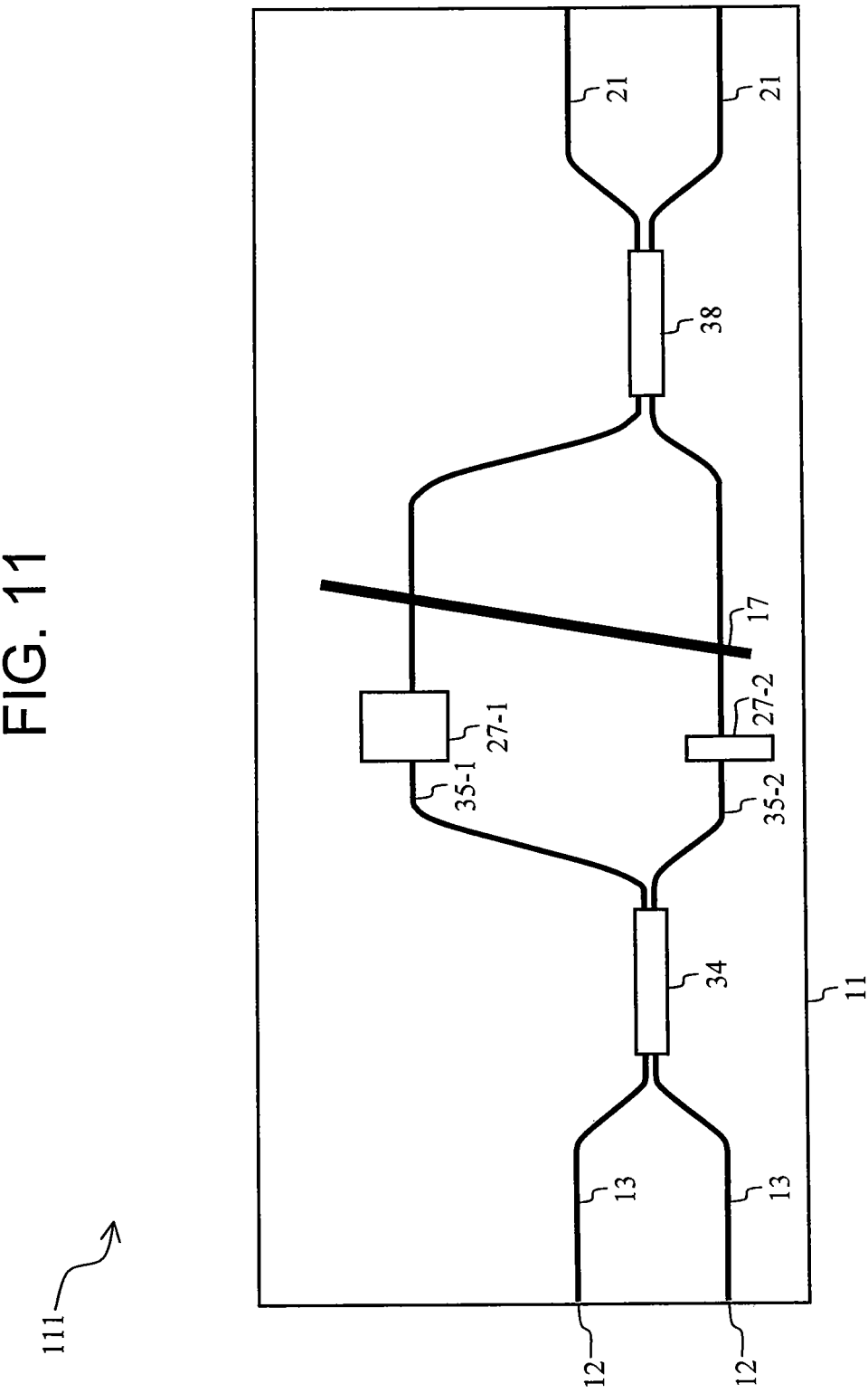
FIG. 11 is a schematic structural view of a Mach-Zehnder interferometer according to the present invention.

The polarization dependence eliminating means 17 is required to have a function to eliminate the difference in MZI transmission center wavelength, and eliminate the polarization dependence of each channel extending from the first coupler 34 to the second coupler 38. More specifically, as in the Mach-Zehnder interferometer 111 of FIG. 11, the polarization dependence eliminating means 17 is placed obliquely to the channel waveguides (35-1, 35-2). The obliquely placed polarization dependence eliminating means 17 can compensate for the optical path length difference between the polarization modes on the first couple 34 side of the polarization dependence eliminating means 17 by the optical path length difference between the polarization modes on the second coupler 38 side of the polarization dependence eliminating means 17.

More specifically, the polarization dependence eliminating means 17 can adjust the asymmetric correction length $\Delta L''$, which has been explained with reference to the mathematical equation 12, according to the angle with respect to the channel waveguides (35-1, 35-2). Where $\Delta L''$ represents the asymmetric correction length to be used by the polarization dependence eliminating means 17 to correct the inter-channel difference in length from the first coupler 34 to the polarization dependence eliminating means 17 on the first couple 34 side of the polarization dependence eliminating means 17, the asymmetric correction length to be used by the polarization dependence eliminating means 17 to correct the inter-channel difference in length from the second coupler 38 to the polarization dependence eliminating means 17 on the second coupler 38 side of the polarization dependence eliminating means 17 is $-\Delta L''$. Accordingly, the polarization dependence of each channel extending from the first coupler 34 to the second coupler 38 can be eliminated by placing the polarization dependence eliminating means 17 at such an angle as to satisfy the following equation: $\Delta L''=-\Delta L'/2$. As for the temperature-dependence compensator (27-1, 27-2) that compensate for the temperature dependence of the optical path length difference, the length of the temperature-dependence compensator 27-2 becomes zero in some cases. In such cases, the same temperature compensating effect can be achieved, since the following relationship is established: $L1'-L2'\neq 0$.

INDUSTRIAL APPLICABILITY

Although embodiments of arrayed waveguide grating optical multiplexers/demultiplexers of the present invention have been described above by way of optical multiplexers and optical demultiplexers, the arrayed waveguide gratings of the present invention can be applied to wavelength routers that are optical multiplexers/demultiplexers. Each of the optical multiplexers/demultiplexers has a plurality of input ports and output ports, and has the wavelength routing function between the input ports and the output ports.

Furthermore the arrayed waveguide gratings used in the present invention are not limited to those formed on silicon substrates, but may be formed on other semiconductor substrates such as silica glass substrates, ceramic substrates, and plastic substrates. The material of the waveguides is not limited to silica-based glass, but the waveguides may be formed with glass of some other component, plastic, or an optical material such as a semiconductor.

The invention claimed is:

1. A waveguide type optical device comprising:
    at least one input channel waveguide formed on a waveguide substrate;
    an input slab waveguide connected to the input channel waveguide;
    an arrayed waveguide formed with a plurality of channel waveguides connected to the input slab waveguide;
    a polarization mode converter provided on the arrayed waveguide;
    an output slab waveguide connected to the arrayed waveguide;
    a temperature-dependence compensating material that is provided on the input slab waveguide, on the output slab waveguide, on the arrayed waveguide on the input slab waveguide side of the polarization mode converter, or on the arrayed waveguide on the output slab waveguide side of the polarization mode converter, and compensates for temperature dependence of an optical path length difference among the channel waveguides of the arrayed waveguide;
    at least one output channel waveguide connected to the output slab waveguide,
    wherein the polarization mode converter eliminates polarization dependence of each channel from the input slab waveguide to the output slab waveguide;
    wherein the polarization mode converter compensates for an optical path length difference between polarization modes on the input slab waveguide side of the polarization mode converter with an optical path length difference between polarization modes on the output slab waveguide side of the polarization mode converter;
    wherein, when $\Delta L''$ represents an asymmetric correction length to be used by the polarization mode converter to correct an inter-channel difference in length from the input slab waveguide to the polarization mode converter on the input slab waveguide side of the polarization mode converter,
    an asymmetric correction length to be used by the polarization mode converter to correct an inter-channel difference in length from the output slab waveguide to the polarization mode converter on the output slab waveguide side of the polarization mode converter is $-\Delta L''$, and
    the following equation is satisfied:

$$\Delta L''=-A\times \Delta L'/2$$

where $\Delta L'$ represents an inter-channel difference in length of an inserted portion of the temperature-dependence compensating material, and A represents a value obtained by dividing birefringence of the input slab waveguide, the output slab waveguide, or the arrayed waveguide on which the temperature-dependence compensating material is placed, by birefringence of the arrayed waveguide.

2. The waveguide type optical device according to claim 1, wherein
    the polarization mode converter is placed at a predetermined angle with respect to an optical axis of each channel waveguide of the arrayed waveguide.

3. The waveguide type optical device according to claim 2, wherein
    a portion of the arrayed waveguide on which the polarization mode converter is placed is a straight-line portion.

* * * * *